US007275475B2

(12) United States Patent
Deschamps et al.

(10) Patent No.: US 7,275,475 B2
(45) Date of Patent: Oct. 2, 2007

(54) APPARATUS DRIVEN BY A PRESSURIZED MEDIUM

(75) Inventors: Benoit Deschamps, Chargey les Gray (FR); Philippe Ostermann, Dijon (FR); Laurent Perrin, Bucey les Gy (FR)

(73) Assignee: Deere & Company, Moline, IL (US)

( * ) Notice: Subject to any disclaimer, the term of this patent is extended or adjusted under 35 U.S.C. 154(b) by 279 days.

(21) Appl. No.: 11/122,503

(22) Filed: May 5, 2005

(65) Prior Publication Data

US 2005/0254933 A1 Nov. 17, 2005

(30) Foreign Application Priority Data

May 11, 2004 (DE) ...................... 10 2004 023 102

(51) Int. Cl.
*F01B 31/00* (2006.01)
*F16L 27/00* (2006.01)

(52) U.S. Cl. ........................... 92/106; 60/403; 285/190

(58) Field of Classification Search .................. 60/403, 60/405; 92/106; 285/190, 273, 274
See application file for complete search history.

(56) References Cited

U.S. PATENT DOCUMENTS 4,767,257 A 8/1988 Kato
2001/0024003 A1 9/2001 Huber et al.
2002/0062587 A1 5/2002 Kimoto et al.
2004/0006980 A1* 1/2004 Berthod et al. ............... 60/413

FOREIGN PATENT DOCUMENTS

| | | |
|---|---|---|
| DE | 1 481 066 | 7/1966 |
| DE | 2 042 437 | 8/1970 |
| DE | 26 00 459 | 1/1976 |
| DE | 82 14 246 | 5/1982 |
| DE | 87 02 088 | 2/1987 |
| DE | 37 25 222 | 7/1987 |
| DE | 38 12 363 | 4/1988 |
| DE | 39 00 939 | 1/1989 |
| DE | 41 11 116 | 4/1991 |
| DE | 94 20 227 | 12/1994 |
| DE | 296 08 422 | 5/1996 |
| DE | 196 48 737 | 11/1996 |
| DE | 197 32 868 | 7/1997 |
| DE | 101 19 356 | 4/2001 |
| DE | 102 25 272 | 6/2002 |
| JP | 01 177985 | 7/1989 |
| JP | 08 109654 | 4/1996 |
| JP | 2000 170197 | 6/2000 |
| WO | WO99/39127 | 8/1999 |

* cited by examiner

*Primary Examiner*—Michael Leslie

(57) ABSTRACT

A pressurized-medium-driven apparatus including an actuator articulately mounted a line segment and a connecting element. The line segment and the connecting element are connected so as to be mutually pivotable with respect to each other around a swing axis. The connection is provided by a junction means between the line segment and the connecting element, wherewith the connecting element and or the line segment are rigid components, preferably a rigid tube or pipe. The junction means is a swiveling junction connection.

7 Claims, 8 Drawing Sheets

APPARATUS DRIVEN BY A PRESSURIZED MEDIUM

BACKGROUND

1. Field of Invention

The invention relates to an apparatus driven by a pressurized medium. The apparatus is comprised of an actuator, which is articulately mounted to be swingable around a swing axis, a line segment, and a connecting element, which is connectable to the actuator. The invention further relates to a loading machine such as an agricultural, forestry machine, or a construction machine.

2. Related Technology

German Patent specification DE 14 81 066 discloses a pressurized-medium-driven apparatus, specifically a hydraulic apparatus employed for swinging, raising or lowering extension arms or front-end loaders on loader vehicles. Ordinarily, such hydraulic apparatuses have a hydraulic cylinder which is swingably mounted between the extension arm or swing arm assembly and a frame of the vehicle. When the hydraulic cylinder is expanded or contracted, the extension arm or swing arm assembly is raised or lowered. Typically, pressurized hydraulic fluid is supplied to the hydraulic cylinder via a rigid hydraulic line comprised of metal, which is connected to flexible hydraulic tubes comprised of plastic or rubber. The metal hydraulic lines are usually mounted on the swingable component parts and are fixed by a suitable holding means. The flexible hydraulic tubes are particularly used for connection between the supply line and the hydraulic cylinder because they are flexibly deformable. The flexible hydraulic tubes can accommodate the relative movements which occur between the hydraulic cylinder and the supply line during a swinging movement.

Flexible hydraulic tubes, when used, are susceptible to potential leakage, and cracking and bursting. Flexible tubes are less robust than metallic lines and thus are more susceptible to damage from articles and obstacles that can come into the range of movement of the hydraulic cylinder. Further, the materials used for flexible hydraulic tubes are more apt to crack or burst than the materials of rigid metal lines.

In the light of these risks, a safety means can be provided that provides protection in the event of failure of the flexible hydraulic tubes and to prevent a sudden loss of pressure in the hydraulic cylinder as a result of such failure. Parts of the hydraulic system that are exposed to the machine load, a loss in pressure would be accompanied by sudden lowering of the extension arm or swing arm assembly. To provide a protective means for the hydraulic cylinders against bursting tubes, loader vehicles, such as telescope loaders, are provided with safety valves, in the form of load-retaining valves, pressure-retaining valves, or tube break protectors, disposed in a part of the hydraulic system exposed to the machine load, namely between the flexible hydraulic tube and the inlet of the hydraulic cylinder. These safety valve arrangements can lead to disadvantageous limitations concerning the engineering design and compactness of the hydraulic system, because the safety valves must be mounted directly on the hydraulic cylinder or integrated into the cylinder housing.

SUMMARY

The present invention relates to a pressurized-medium-driven apparatus that completely eliminates the use of flexible hydraulic tubes in parts of the hydraulic system that are exposed to the machine load. According to the present invention, the pressurized-medium-driven apparatus has a line segment and a connecting element that are connected so as to be mutually swingable with respect to each other around the swing axis. As a result of the fact that the line segment and the connecting element can be arranged so as to be mutually swingable around the swing axis of the actuator, the connecting element, which provides the link from the line segment to a pressurized-medium chamber of the actuator, can follow the swinging movement of the actuator, and thus there is no relative movement between the actuator and the connecting element. Preferably, the line segment is mounted to or disposed along a component which is to be swung by the actuator. The component can be an extension arm or swing arm assembly. Consequently, the relative movement that occurs between the line segment and the connecting element is the same as the relative movement that occurs between the actuator and the component swung by the actuator. The pressurized-medium-driven apparatus can be a pneumatic or hydraulic apparatus, wherein a hydraulic or pneumatic cylinder can be controlled and operated. The supply of pressurized medium can be from customary sources such as hydraulic pumps or air compressors, with suitable valve means interposed between the source and the line segment for supplying the cylinder. Thus, the line segment is a part of the connection of the actuator with the source of pressurized medium, and can serve both to supply pressurized medium to the pressurized-medium chamber of the actuator and to withdraw pressurized medium from said chamber.

A junction means can be provided between the line segment and the connecting element to connect the line segment to the connecting element. Preferably such junction means has a connecting axis that coincides with or can be brought into alignment with the swing axis of the actuator. In particular, the junction means can comprise a union connector, and an overlapping telescoping pipe ends having seal means.

Because the junction axis is coaxial with the swing axis, there are no relative movements between the connecting element, the hydraulic cylinder or the line segment. The segment can be a robust rigid piece. The connecting element can be directly connected to the cylinder by a flange connection and can serve as a support or holding means for the junction means. The additional support provides assurance that the junction axis will be maintained in alignment with the swing axis of the hydraulic cylinder.

In an alternative configuration, the connecting element can be a rigid hydraulic tube or a pipe comprised of steel or brass. The rigid pipe can be directly connected to the wall of the hydraulic cylinder by a customary hydraulic fitting means. The pipe can also be configured such that it opens out directly on the swing axis means. Further, the connecting element can be configured as a metal block connected to the hydraulic cylinder by a flange connection, and has a rigid connecting line in the form of a bore, which leads form the pressure-medium chamber to the swing axis or junction axis.

By appropriate robust engineering design of the connecting element the junction means and the line segment ensure ample rigidity is achieved while providing for and maintaining the appropriate degrees of freedom around the swing axis or the junction axis. The junction means can also be firmly installed to have its axis maintained in alignment with the swing axis.

It is also possible to have the connecting element configured as a piece which is rigidly connected to the actuator, such as a pivot bolt connected to the housing of the actuator, where the actuator is swingable around the longitudinal axis of the pivot bolt. Preferably, the junction means is fixed to the pivot bolt to ensure affixation of the junction axis coaxially with the swing axis of the actuator. The junction means can be connected to the pressurized-medium chamber of the actuator by means of one or more bores interior to the pivot bolt. The swing articulation is preferably configured such that the actuator is swingably mounted on the pivot bolt and the pivot bolt is rigidly connected to the swing arm assembly. In this configuration, it is also conceivable for the actuator and pivot bolt to include a rigidly connected unit, with the pivot bolt swingably mounted on the swing arm assembly.

A rigid holding means can also be provided, which are anchored in the region of the swing bearing on the actuator or on the component that is to be swung. The holding means extends into the region of the swing axis or junction axis, where the holding means secures the connecting element, the junction means and the line segment, to ensure that the junction axis permanently coincides with the swing axis. Preferably, the line segment is also in a hydraulic tube, which is rigidly constructed and configured. In the alternative, the hydraulic tube is fixed to the component which is to be swung such that the junction axis is fixed wherein the rigid line segment at least facilitates this reliable axis alignment.

The junction means can include a swiveling hydraulic or pneumatic fitting, screw-connected swivel joints, and can have, a straight, angled, or S-shaped form. Swivel joints serve to join components such as pipes or tubes and have at least two connecting sides which are mutually swingable around a fixed junction axis. At the same time, the swivel joint allows passage of a pressurized medium and transmission of the pressure of the medium of the components thereby joined. Such screw-connected swivel joints for hydraulic applications and are commercially available.

To protect an actuator against tube failure, a safety valve, particularly a load-retaining, a pressure-retaining valve, or tube failure protection valve, can be provided. It is advantageous that neither the connecting element nor the line segment, nor any of the commercially available junction means, employs or requires flexible hydraulic tubes, and thus it is unnecessary to dispose the safety valve directly at the actuator.

The safety valve can be disposed at a structurally advantageous location inside the pressurized-medium-driven apparatus. In an embodiment in which more than one actuator is provided, this allows a plurality of actuators to be protected with a single safety valve, which can yield appreciable cost savings. The single safety valve can be disposed in a main line, ahead of branches to the individual line segments for the respective actuators. According to another embodiment of the invention, a pressurized-medium reservoir can be provided, which facilitates pressurized-medium-driven spring-loading. It is particularly advantageous if the reservoir can be arranged in combination with a safety valve, where it is unnecessary to connect the reservoir directly to the actuator. The safety valve can be disposed at almost any desired location in the pressurized-medium-driven apparatus and the design advantages to allow the freedom to locate the pressured-medium reservoir or a plurality of such reservoirs.

An inventive hydraulic apparatus is suitable for raising and lowering an extension arm of a loading vehicle, such as a telescoping loader. For safety reasons, telescoping loaders, in particular, must have protective means for instances of tube failure. The use of such protective means has restrictive consequences concerning the layout and disposition of hydraulic components. Because the connecting element for the hydraulic cylinder, the supply line segment, and junction means can be constructed as rigid robust components, the protective means against tube failure does not need to be disposed directly on or at the hydraulic cylinder.

An inventive pressurized-medium-driven apparatus can be employed in a loader such as a front-end loader, telescoping loader or wheel loader. The loader can include one or more actuators used to raise and lower a loading arm, extension arm, or swing arm assembly. In particular, when a plurality of actuators are used, appreciable cost savings can be achieved by eliminating one or more safety valves. It is also possible to install a spring-loading means; the necessary adaptations for this are facilitated by the fact of the advantageous and simplified positioning possibilities for the safety valve(s) and pressure-medium reservoir(s) according to the present invention.

The loaders can include pressurized-medium-driven apparatuses for positioning assemblies and devices capable of receiving a loader implement. The robustness and stability of the apparatus is enhanced by the possibility of eliminating the use of flexible hydraulic tubes in the hydraulic supply lines for one or more actuators in the region of said receiving devices.

The pressurized-medium-driven apparatus can be employed in agricultural or forestry machines, such as tractors, soil cultivating machines, harvesting machines, uprooting machines, etc., and construction machines, such as excavators or cranes. Such machines can have a plurality of actuators, which can be operated. The apparatus can also be used in agriculture tasks on a device towed by a tractor. Such towed devices can operate under arduous conditions. They commonly have lifting mechanisms with actuators having flexible pressurized-medium tubes which while in operation are threatened by projecting three branches, shrubbery, or other items. The stability and robustness of the system can be improved, by minimization or elimination of flexible pressurized-medium tubes.

BRIEF DESCRIPTION OF THE DRAWINGS

The inventive and additional advantages, advantageous refinements, and advantageous configurations thereof will be described further herein below, with reference to the accompanying drawings which illustrate some exemplary embodiments of the invention.

DETAILED DESCRIPTION

Figure 1:
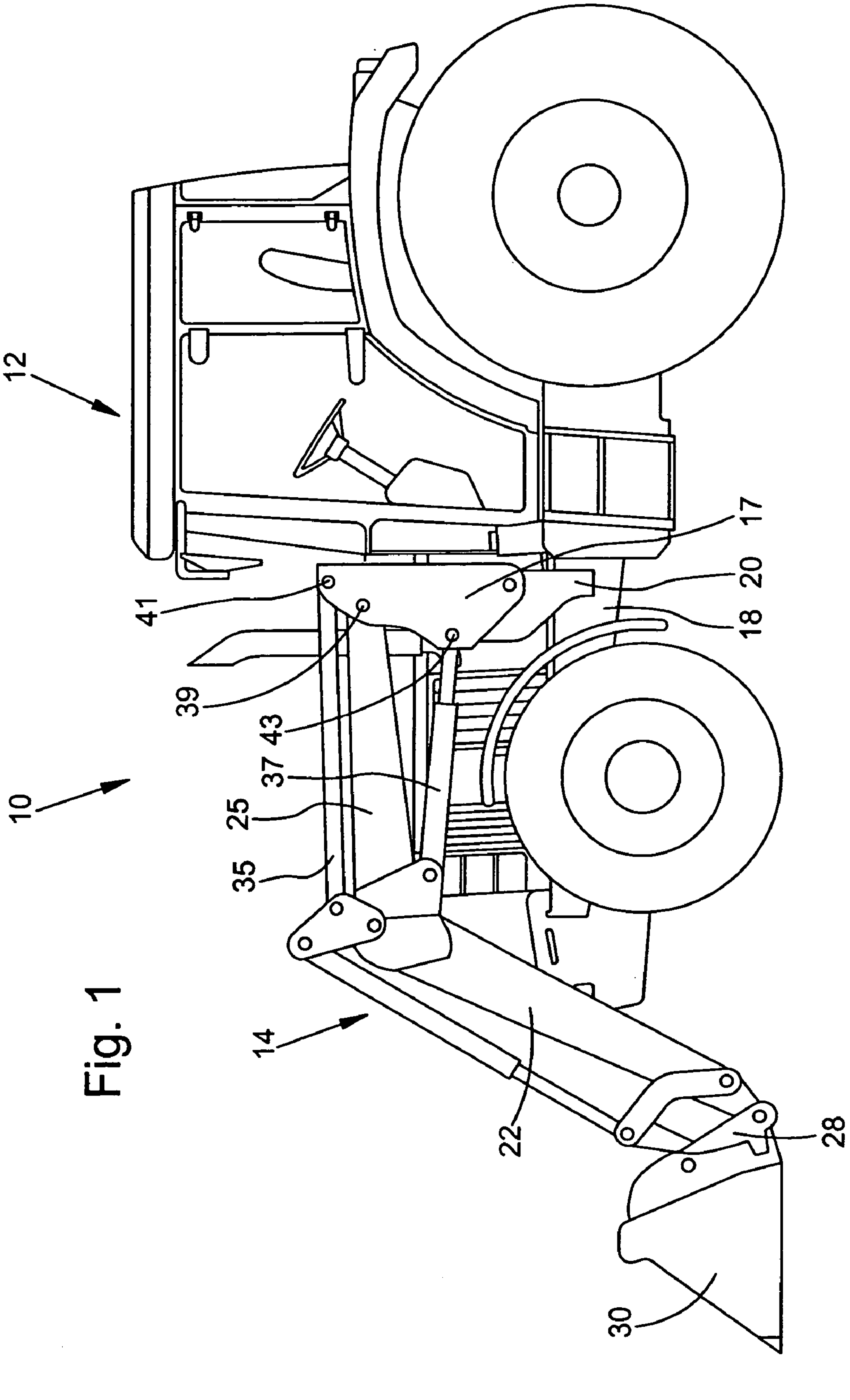
FIG. 1 is a schematic representation of a loading machine with an apparatus driven by a pressurized medium according to the invention.

FIG. 1 shows a loading machine 10 which has a front end loader implement mechanism 14 mounted on a tractor 12. The loader implement mechanism 14 is attached to the tractor 12 on both sides by means of connecting brackets 16, 17 mounted on a support bracket 20 which is connected to a frame 18 of the tractor 12.

Figure 2:
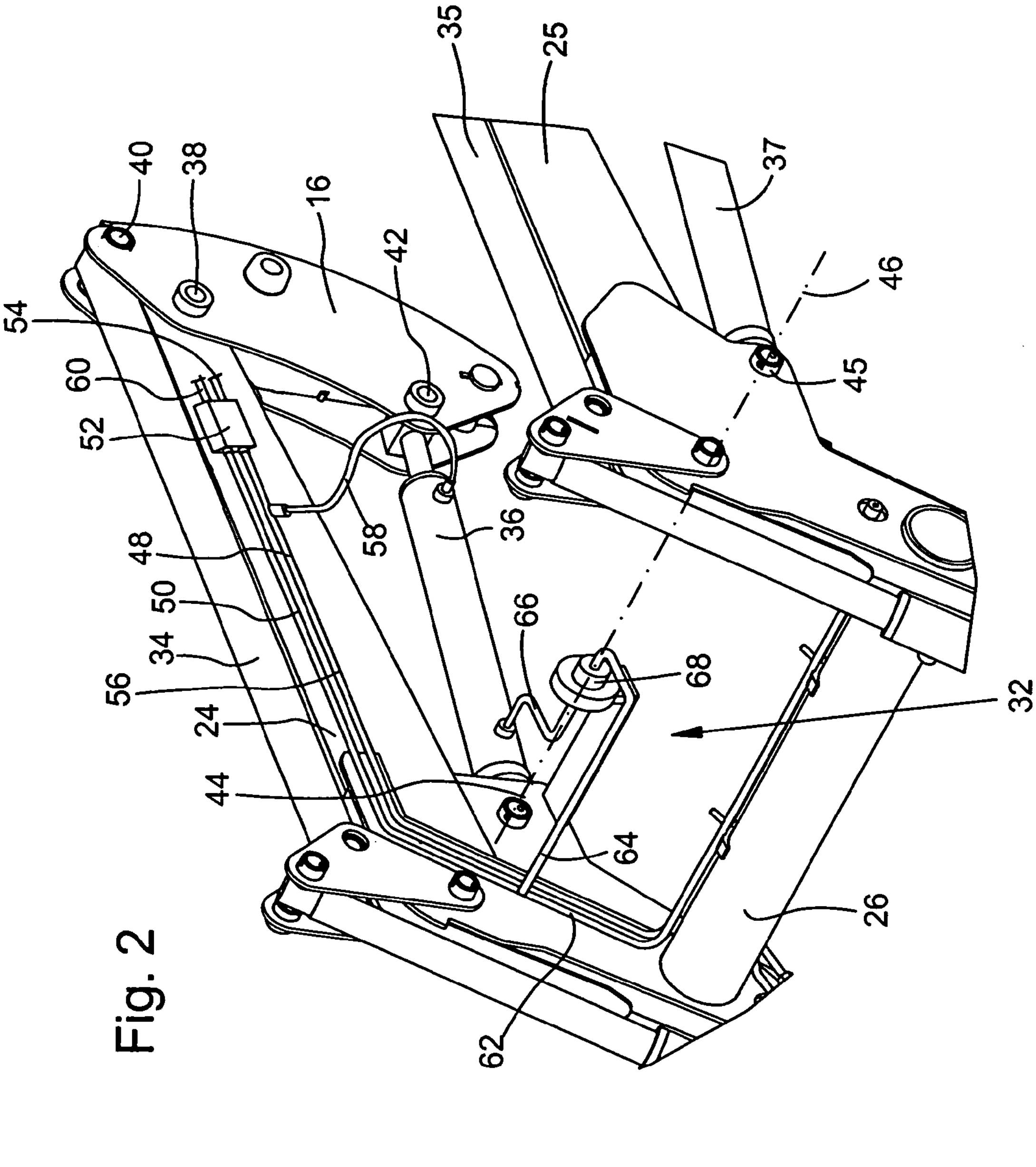
FIG. 2 is a partial perspective view of the pressurized-medium-driven apparatus according to in FIG. 1 with the swinging mechanism.

The front end loader implement mechanism 14 has an extension arm or swing arm assembly 22 comprised of two parallel swing arms 24, 25, each of which swing arms is swingably connected to the respective connecting bracket 16, 17. To stabilize the swing arm assembly 22, a crossbeam 26 is provided as shown in FIG. 2 which interconnects the two swing arms 24, 25. At the front end region of the front end loader implement mechanism 14, a device 28 for receiving the loader implement 30 is provided. The loading machine 10 shown as shown in FIG. 1 has a loading shovel as the loader implement 30. Other loader implements, such as forks or grippers, can be mounted on the receiving device 28. The front end loader implement mechanism is provided with a device 32 which is driven by a pressurized medium, which device 32 serves to swing or raise and lower the swing arm assembly 22. The device 32 is illustrated in detail in FIGS. 2-6. The front end loader implement mechanism 14 also has parallel guide rods 34, 35 which hold the loader implement 30 in a constant position with respect to the ground beneath the loading machine 10.

The pressurized-medium-driven device 32 as illustrated in FIG. 2, has on both sides of the swing arm assembly 22 a respective actuator 36, 37 in the form of a hydraulically driven positioning cylinder. To accomplish a swinging movement of the swing arm assembly 22, the swing arms 24, 25, parallel guide rods 34, 35, and actuators 36, 37 are swingably connected to the connecting brackets 16, 17 via pivot bolts 38, 39, 40, 41, 42, 43 where only the bolts 38, 40, and 42 for one side of the swing arm assembly 22 are visible in FIG. 2. The actuators 36, 37 are connected to the swing arms 24, 25 via additional pivot bolts 44, 45 which define a swing axis 46 around which the respective actuators 36, 37 execute swinging movements with respect to the swing arm assembly 22.

In one embodiment, the actuators 36, 37 can be positioning cylinders which are connected on their plunger side to the connecting brackets 16, 17 and on their piston side to the swing arms 24, 25. Pressure can be applied to the piston side in order to raise the swing arm assembly 22, and to the plunger side in order to lower the swing arm assembly 22. Alternatively, the actuators 36, 37 can be mounted in the opposite direction of orientation from that shown.

Pressurized medium is fed to the actuators 36, 37 via a line 48 leading to the plunger side and second line 50 leading to the piston side. A safety valve 52 in the form of a pressure retaining valve is disposed in the lines 48, 50, in order to protect the actuators 36, 37 against an abrupt drop in pressure.

The line 48 on the plunger side has a first flexible line segment 54, a rigid line segment 56, and a second flexible line segment 58. The first flexible line segment 54 opens out into the safety valve 52. The rigid line segment 56 leads from the safety valve 52 and extends to the opposite side of the swing arm assembly 22 in order to supply pressurized medium to the second actuator 37. The second flexible line 58 leading to the contraction side or the lowering side of the actuator 36 branches off from the rigid line segment 56. The flexible line segments 54, 58 can accommodate relative movements between the plunger side of the actuator 36 and the swing arm 24, and between the swing arm 24 and the connecting bracket 16, resulting from swinging movements.

The line 50 leading to the piston side has a flexible line segment 60, first rigid line segment 62, a second rigid line segment 64, and a connecting element 66 which is also rigid. The flexible line segment 60 opens out into the safety valve 52. the first rigid line segment 62 leads from the safety valve 52 to the pressurized media supply of the second actuator 37 on the opposite side of the swing arm assembly 22. The second rigid line segment 64 braches outward from the first rigid line segment 62 and opens out into a swiveling junction connection 68 for pressurized-medium lines. A connecting element 66 extends from the junction connection 68 to the piston side or the thrust side of the actuator 36.

The junction connection means 68 can be a swiveling junction connection for pressurized-medium lines configured such that the second rigid line segment 64 of the piston-side line 50 is swingably connected to the connecting element 66. The later is rigid. Such swiveling junction connections are available, by the company PARKER, a manufacturer of pressurized-medium-driven components and accessories.

The junction connection 68 can be positioned such that its swing axis coincides with the swing axis 46 of the actuators 36 and 37. To fix this position, holding means 70 are provided as shown in detail in FIG. 3. The holding means 70 includes an angle profile piece 72 at one end of which is rigidly fixed to the swing arm 24, by welding. At the other end, a holding member 74 is provided which is rigidly attached to the angle profile piece 72. The holding member 74 extends around and holds the junction connection 68. Such holding means can have myriad other configurations and the forms of such holding means is not limited to that illustrated in FIGS. 2 and 3. The holding means 70 can be excluded if provided the necessary holding of The junction connection 68 by means of an appropriately robust construction of the rigid line segments 62, 64 and the connecting element 66 is provided.

One embodiment of control means for the pressurized-medium-driven device 32 will now be described, with reference to the schematic hydraulic circuit diagram is shown presented in FIG. 4. Hydraulic fluid from a hydraulic tank 75 is pumped by a hydraulic pump 76 to operate the actuators 36, 37. A control valve 77 controlled by the operator of the loading machine 10 controls the back and forth flow of hydraulic fluid in the line segments 54, 60 for the plunger-side and piston-side lines 48, 50. The control valve 77 is preferably in the form of an electrically actuatable slide valve having three switching positions, namely, raise, lower, and neutral.

In the "raise" position, the hydraulic pump 76 is connected with the piston-side line 50 and the hydraulic tank 75 is connected with the plunger-side line 48. in the "lower " position the hydraulic pump 76 is connected with the plunger-side line 48 and the hydraulic tank 75 is connected with the piston-side line 50. In the "neutral" position, the connections of the hydraulic pump 76 and hydraulic tank 75 to the lines 48 50 are interrupted. The line segments 54, 60 are connected to the safety valve 52. Safety valve 52 comprises a controllable pressure limiting valve 78 and a bypass line 82 provided with a check valve 80.

Figure 4:
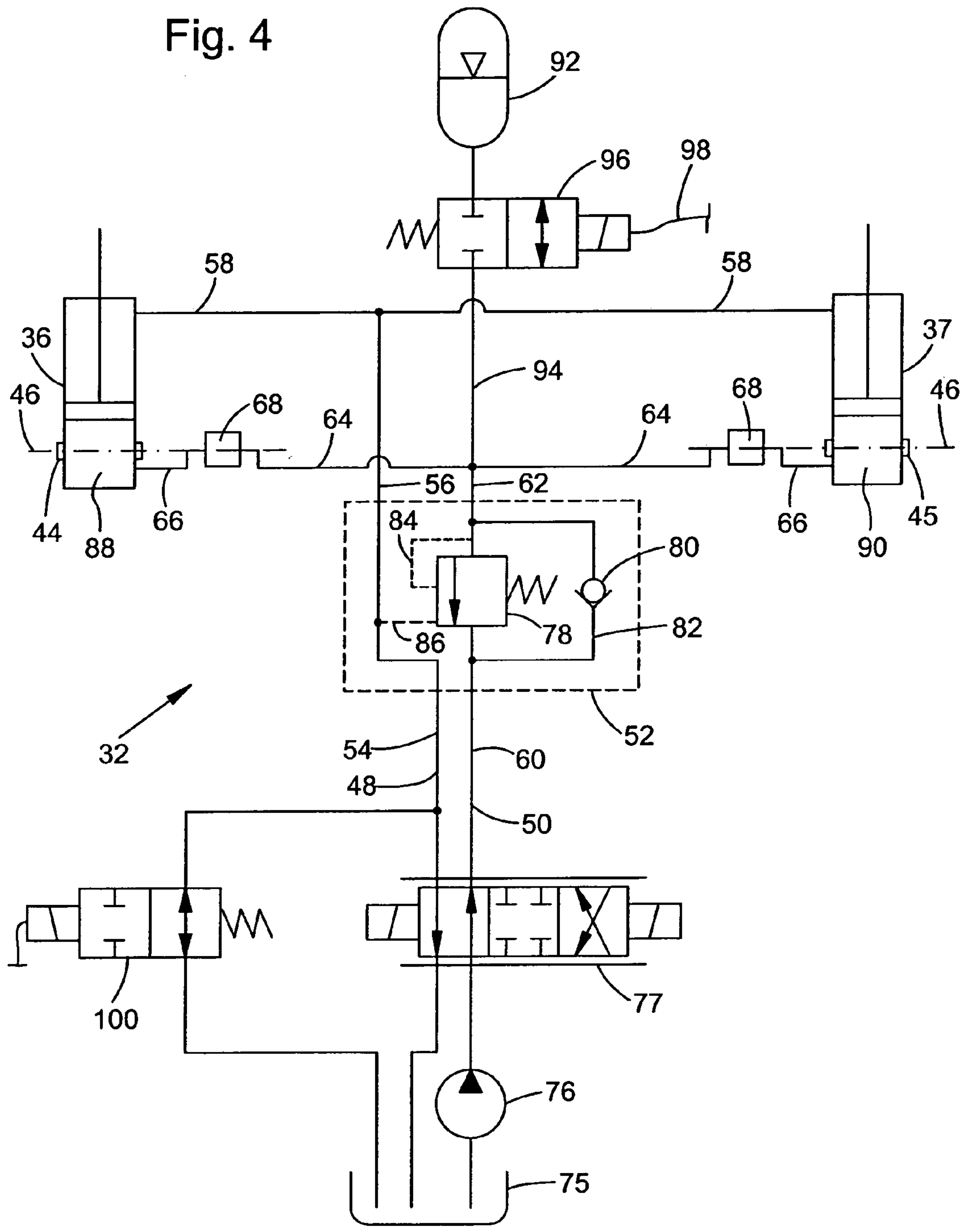
FIG. 4 is a schematic hydraulic circuit diagram for a pressurized-medium-driven apparatus of the present invention.

The pressure limiting valve 78 in its normal position closes the piston-side line 50, as illustrated in FIG. 4, but a bypass of the pressure limiting valve 78 is provided by the bypass line 82 in combination with the check valve 80, acting in the direction toward the actuators. When a preset "control pressure" is reached, the pressure limiting valve 78 is opened in the direction of the hydraulic tank 75, by means of a first pressure control line segment 84 which can be connected to the piston-side rigid line segment 62, or by means of a second pressure control line segment 86 which is connected to the plunger-side line 50. Thereby the first pressure control line serves for overload protection for the actuator 36 or 37, wherewith when a critical operating pressure is reached the pressure limiting valve 78 is opened. Beyond the safety valve 52, toward the actuators 36, 37, the rigid line segments 56, 62 of the plunger-side line 48 and the piston-side line 50, respectively, are connected; from these, the plunger-side flexible lines 58, 58 lead to the actuators 36, 37, and the piston-side rigid lines 64, 64 lead to the junction connections 68, 68. Beyond the junction connections 68, 68 toward the actuators 36, 37 the connecting line segments 66, 66 are connected, which are in the form of rigid line segments leading to the piston-side chambers 88, 90 of the actuators 36, 37.

In another embodiment, a hydraulic fluid reservoir 92 can be connected to the first rigid line segment 62 of the piston-side line 50 via a third rigid line segment 94 and a shutoff valve 96 having a closed and an open position.

Figure 5:
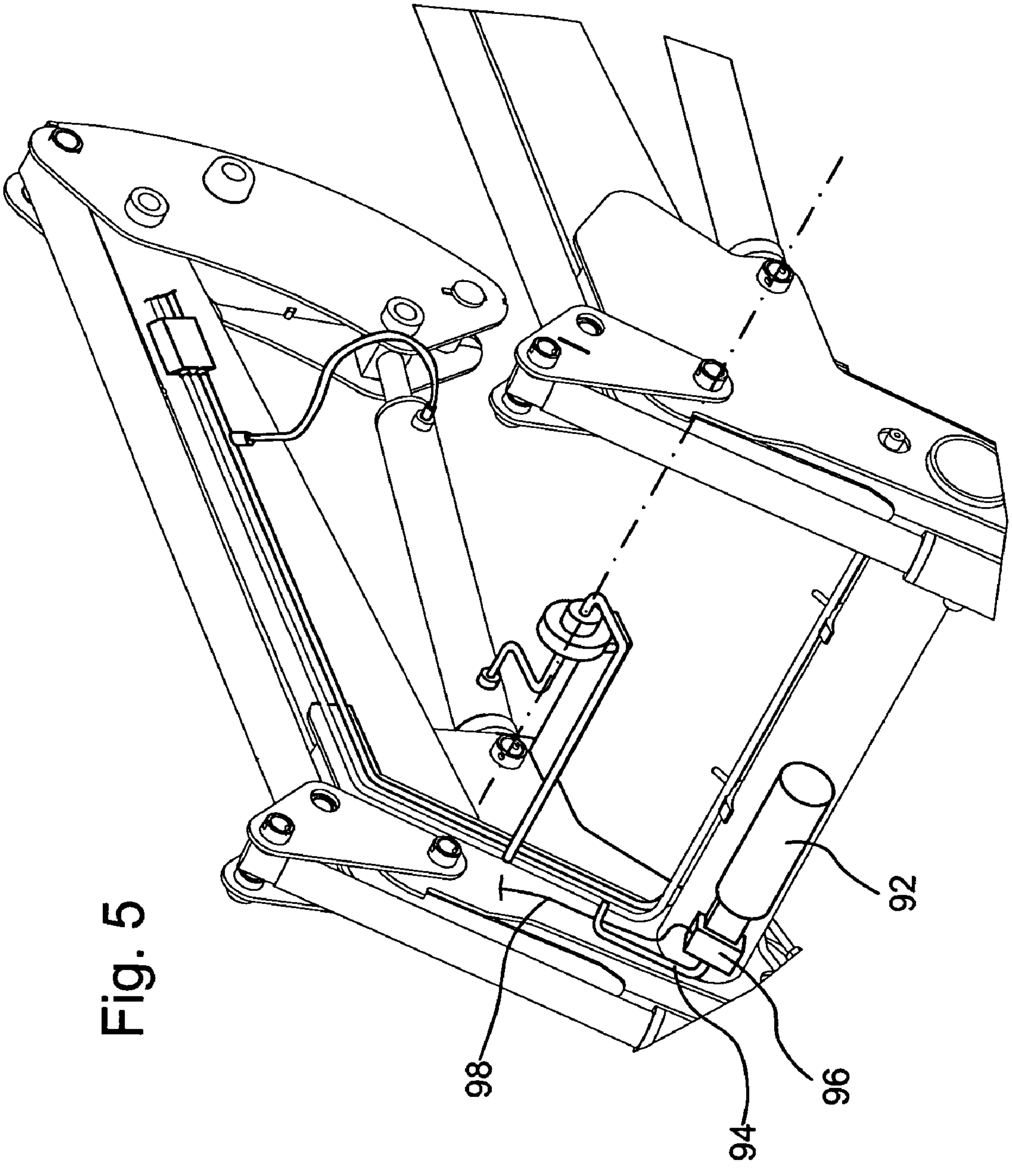
FIG. 5 is a partial perspective view of the pressurized-medium-driven apparatus according to FIG. 1 with a reservoir for the pressurized medium.

The hydraulic fluid reservoir 92 is disposed on the cross-beam 26 of the swing arm assembly 22 as shown in FIG. 5. It is also conceivable that the hydraulic fluid reservoir 92 to be disposed inside a hollow crossbeam 26, which has an interior cavity to accommodate it. Alternatively, the hydraulic fluid reservoir 92 can be disposed elsewhere on the swing arm assembly 22. The shutoff valve 96 can be actuated by an electric line 98, to connect or disconnect the hydraulic fluid reservoir 92 from the circuit. The hydraulic fluid reservoir 92 provides an element of spring-loading of and mediated by the pressurized hydraulic fluid, whereby an impulse acting on the swing arm assembly 22 can be accommodated and dampened. In order to ensure that when the control valve 77 is closed or in the "neutral" position the actuators 36, 37 can undergo a spring-loaded movement, a spring-loaded valve 100 is provided, in the form of a shutoff valve; valve 100 enables plunger-side flow of hydraulic fluid into the tank. When the spring-loading function is activated, preferably the shutoff valve 96 and the shutoff valve 100 are both open.

Because the line segments 62, 64, 66 beyond the safety valve 52 in the direction of the actuators 36, 37 are connected to the piston-side chambers 88, 90. in the form of rigid lines, one safety valve 52 can be used to protect both actuators 36, 37. Also, the rigid line segments 64, 66 are not subjected to bending stresses during the swinging movement of the swing arm assembly 22 or the actuators 36, 37, because the connection axes of the corresponding junction connections 68, 68 are coaxial with the swing axis 46 of the actuators 36, 37. It is particularly advantageous that with this arrangement the safety valve 52 and the hydraulic fluid reservoir 92 can be disposed at structurally favorable locations, at an appreciable distance from the actuators 36, 37.

In the following, the functions of the hydraulic system will be described in more detail with reference to the hydraulic circuit diagram of FIG. 4. In the "raise" position, the hydraulic fluid is supplied to the safety valve 52 through a flexible line segment 60 which is in the form of a flexible hydraulic pressure line. The pressure limiting valve 78 in the safety valve 52 is closed. The fluid passes through the bypass line 82 to the output of the safety valve 52 and flows via the rigid line segment 62 into the rigid line segments 64, 64. The junction connections 68, 68 disposed on the swing axis 46 provide connection to the piston-side chambers 88, 90 via the connecting line segments 66, 66 which here are rigid, whereby the actuators 36, 37 are expanded. At the same time. on the plunger side, hydraulic fluid can flow into the hydraulic fluid tank 75. Swinging movements of the actuators 36, 37 and the associated connecting line segments 66 and rigid line segments 64 occur exclusively around the swing axis 46 via the junction connections 65, 68 disposed coaxially to the swing axis 46; as a result, in the piston-side line 50 beyond the safety valve 52 toward the actuators 36, 37 it is unnecessary to have any flexible lines. If necessary, the already present hydraulic fluid reservoir 92 can he connected on the piston side, wherewith the actuators 36, 37 are connected on the piston side to the hydraulic fluid reservoir 75.

In the "neutral" position, the control valve 77 is closed, so that no hydraulic fluid can flow into the hydraulic fluid tank 75. However, when a hydraulic fluid reservoir 92 is provided, the shutoff valve 100 can be opened by actuating the spring function, wherewith even if the control valve 77 is closed one can have flow into the hydraulic tank 75 from the plunger side.

In the "lower" position, hydraulic fluid is passed through the plunger-side line 48, and a corresponding operating pressure builds up. This increasing pressure causes the pressure limiting valve 78 to open, via the second pressure control line segment 86, whereby at the same time hydraulic fluid can flow out of the piston-side line 50. The "lower" position allows the swing arm assembly 22 to be lowered rapidly, but still under pressure. When such rapid lowering under pressure occurs, the shutoff, valve 100 must be closed, because otherwise the hydraulic fluid which is needed would flow out directly into the hydraulic fluid tank 75.

Figure 3:
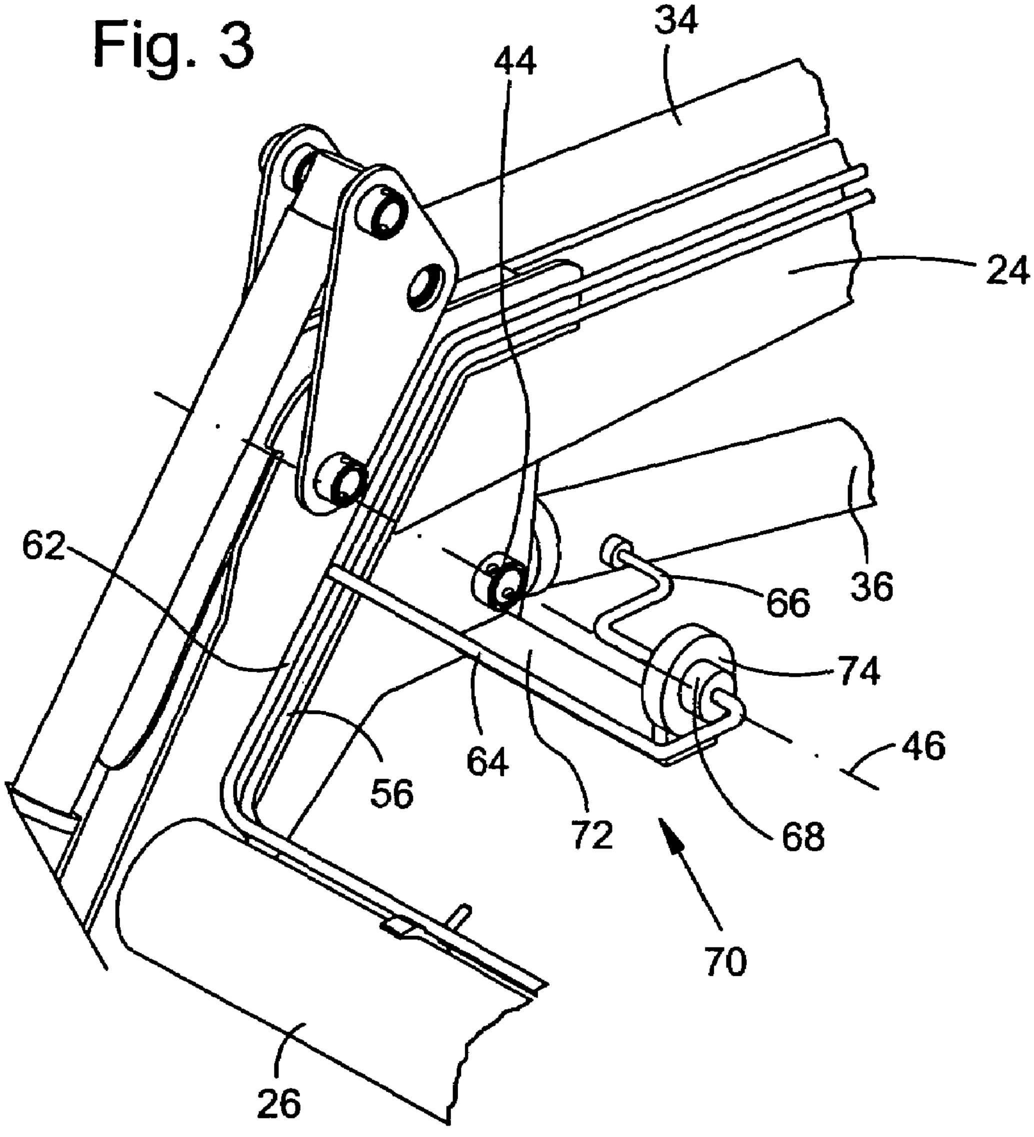
FIG. 3 is a detail perspective view of the swinging mechanism in FIG. 2.
Figure 6:
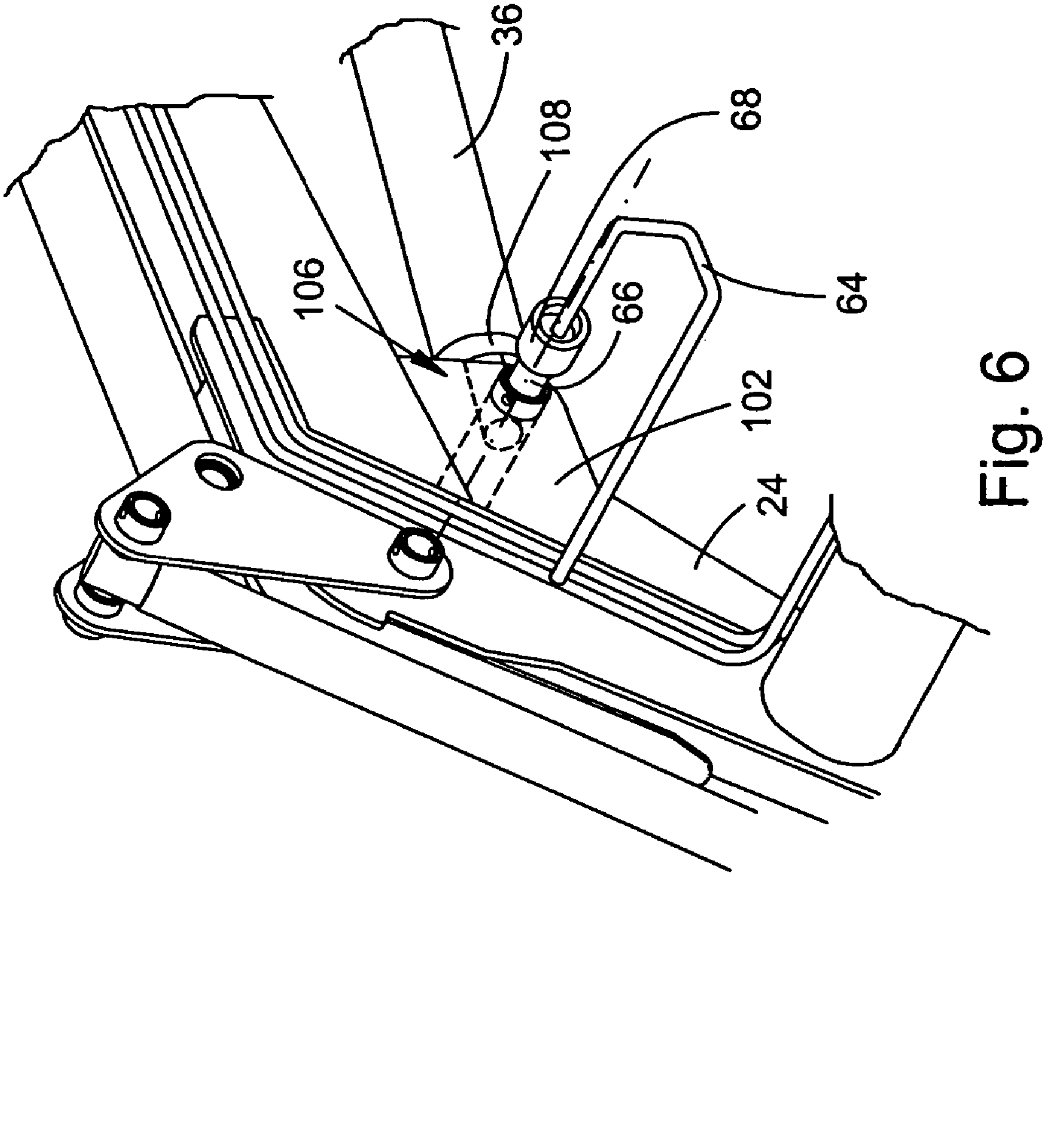
FIG. 6 is a perspective detail view of a second embodiment of the swinging mechanism.
Figure 7:
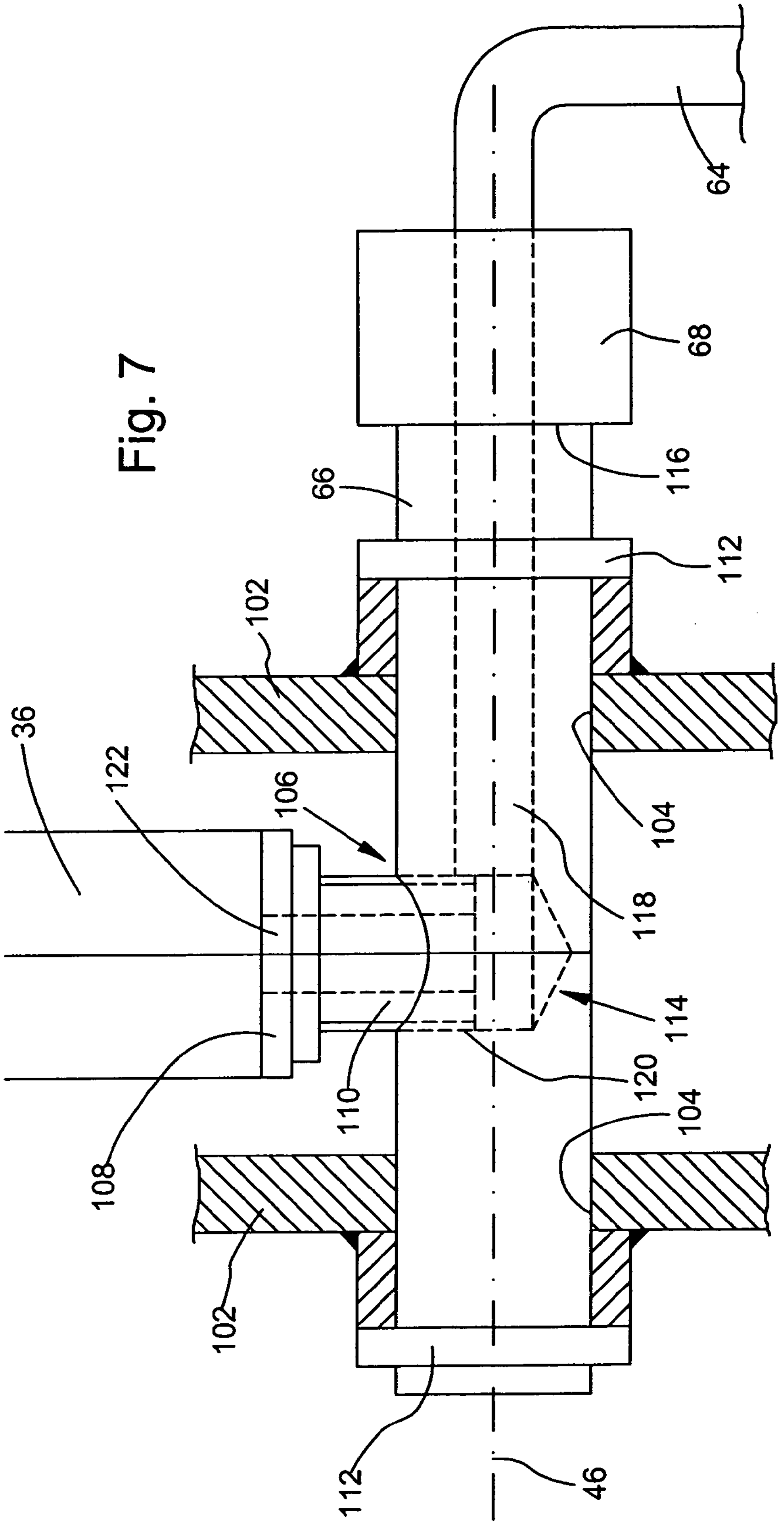
FIG. 7 is a perspective detail view of a second exemplary to FIG. 6.

In an alternate embodiment, the connecting line segment 66 shown in FIGS. 2, 3, and 5 is integrated into the pivot bolt connections 44, 45, wherewith a connecting line segment 66 in the form of a pivot bolt is employed as shown in FIGS. 6 and 7. In the following, this will be described in more detail for the swing arm 24 disposed forwardly on the right side of the tractor 12. The arrangement for the corresponding left swing arm is analogous.

The swing arm 24 has opposite lateral walls 102 in which swing bearing bores 104 for swingable support of the connecting line segment 66 are provided. The connecting line segment 66 is fixed radially on the swing axis 46 by means of said swing bearing bores 104. On the piston side, the actuator 36 is disposed between the side walls 102. The actuator 36 is connected to the connecting line segment 66 by a threaded connection 106. The actuator 36 has a bottom plate 108 on the piston side and an adjoining threaded nipple 110 which extends perpendicularly to the swing axis 46 in the direction toward the connecting element 66. The connecting line segment 66 connects the junction connection 68 to the actuator. In this configuration, the pivot bolt 124 is rigidly connected to the swing arm 24, wherewith the actuator 36 can execute a swinging movement around the pivot bolt 124 and the junction connection 68 accommodates the relative movement, and is fixed axially in the direction of the swing axis 46 by means of retaining discs 112. The connecting line segment 66 has an actuator-side connecting configuration 114 and a junction-side connecting configuration 116. Between the two connecting configurations 114, 116 a first pressurized-medium bore 118 extends along the pivot axis 46. The junction-side connecting configuration 116 is connected directly to the connecting line segment 66 employed in this embodiment, preferably by screwing. The parameters specified by the manufacturer(s) of the junction connections, e.g. the firm PARKER, should be taken into account for the connection of the junction-side connecting configuration 116 to the connecting line segment 66.

The actuator-side connecting configuration 114 is preferably disposed centrally between the lateral walls 102 and has a threaded bore 120 that matches the threaded nipple 110. A second pressurized-medium bore 122 extends through the threaded nipple 110, which bore leads in from the free end of the threaded nipple 110 to the piston-side chamber 88 of the actuator 36. The first and second pressurized-medium bores 118, 122 are joined by joining by screwing the actuator-side connecting configuration 114 to the threaded nipple 110. The pressurized medium can be supplied to the actuator 36 and can be swung around the swing axis 46. The connecting line segment 66 can be a robust pivot bolt and is fixed both axially and radially, though swingable, with respect to the swing axis 46, it is unnecessary to have holding means 70 for the junction connection 68.

Figure 8:
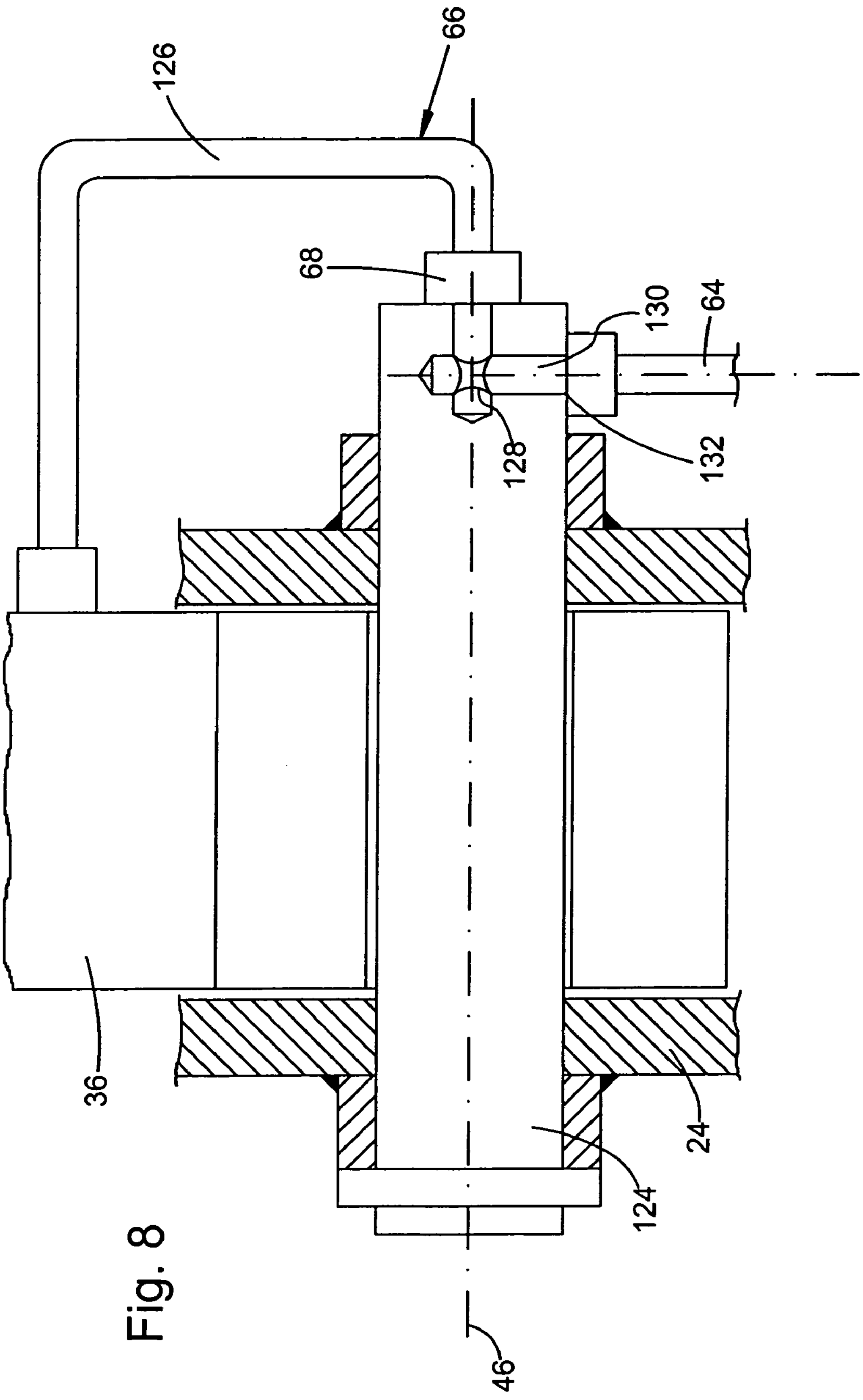
FIG. 8 is a cross section of a third embodiment of the swinging mechanism.

A third embodiment is illustrated in FIG. 8, wherein the connecting element 66 is connected via a swiveling junction connection 68 to a pivot bolt 124 of the pivot bolt connection 44, and has a third rigid line segment 126 which connects the junction connection 68 to the actuator. The junction connection 68 is mounted directly on the pivot bolt 124. Starting from the junction connection 68 a first connecting bore 128 extends longitudinally with respect to the swing axis 46 into the interior of the pivot bolt 124, and intersects a second connecting bore 130 to a connecting configuration 132 on the periphery of the pivot bolt 124, which connects to the second rigid line segment 64 of the piston-side line 50. A connection to the junction connection 68 is provided inside the pivot bolt 124 by the connecting bores 128, 130. Because of the fact that the junction connection 68 is mounted directly on the pivot bolt 124 coaxially to the swing axis 46, one ensures that the junction connection 68 is reliably positioned on the swing axis 46. With this arrangement, the pivot bolt 124 is rigidly connected to the swing arm 24, wherewith the actuator 36 can execute a swinging movement around the pivot bolt 124, and the junction connection 68 accommodates the relative swinging movement between the connecting line segment 66 and the third rigid line segment 126 and the pivot bolt 124. Analogously, it is conceivable to rigidly connect the pivot bolt 124 to the actuator 36. wherewith the pivot bolt 124 will be pivotably mounted on the swing arm 24. With this arrangement, the junction connection 68 is connected to the second rigid line segment 64 of the piston-side line 50, so that the swinging movements between the swing arm 24 and the pivot bolt 124 are accommodated by the junction connection 60, and the third rigid line segment 126 can lead directly from the pivot bolt 124 to the actuator, because now there are no swinging movements between the pivot bolt 124 and the actuator 36.

It is therefore intended that the foregoing detailed description be regarded as illustrative rather than limiting, and that it be understood that it is the following claims, including all equivalents, that are intended to define the spirit and scope of this invention.

The invention claimed is:

1. A pressurized-medium-driven apparatus comprising:

an actuator mounted to a swing arm assembly so as to be swingable around a swing axis;

a line segment defined by a rigid tube having at least one end disposed along said swing axis;

a connecting element, defined by a second rigid tube, the connecting element being coupled to the actuator and having an end disposed along said swing axis, and;

a junction connection coupling said at least one end of the line segment to said end of the connecting element and establishing a swivel connection, whereby said line segment and said connecting element are connected to each other to be mutually rotatable about the swing axis.

2. The apparatus of claim 1 wherein the junction connection is a screw connected swiveling junction connection.

3. The apparatus of claim 1 wherein said connecting element is defined by a pivot bolt disposed along said swing axis and coupling said actuator to said swing arm assembly.

4. The apparatus of claim 1 further comprising a holding means fixed to said swing arm assembly, the junction connection being affixed to the holding means in a position on the swing axis.

5. The apparatus of claim 1 wherein said actuator is coupled to said swing arm assembly for lifting said assembly by pressurizing a piston-side of said actuator; said connecting element establish a fluid connection with said piston-side of said actuator, and said apparatus further comprising a safety valve disposed at a fixed location spaced from said actuator, and being coupled in fluid communication with said line segment and normally preventing flow away from said piston-side of the actuator.

6. The apparatus of claim 5 wherein the safety valve includes a pressure limiting valve and a check valve located in a bypass line coupled in parallel with said pressure limiting valve.

7. The apparatus of claim 5 further comprising a pressurized-medium reservoir, connected to a piston-side line of the actuator.

* * * * *